Sept. 4, 1962  P. D. MITCHELL  3,052,141
TIRE REPAIR GUN AND CARTRIDGE
Filed July 9, 1959  4 Sheets-Sheet 1

INVENTOR.
PAUL D. MITCHELL
BY
ATTORNEY

Sept. 4, 1962  P. D. MITCHELL  3,052,141
TIRE REPAIR GUN AND CARTRIDGE
Filed July 9, 1959  4 Sheets-Sheet 2
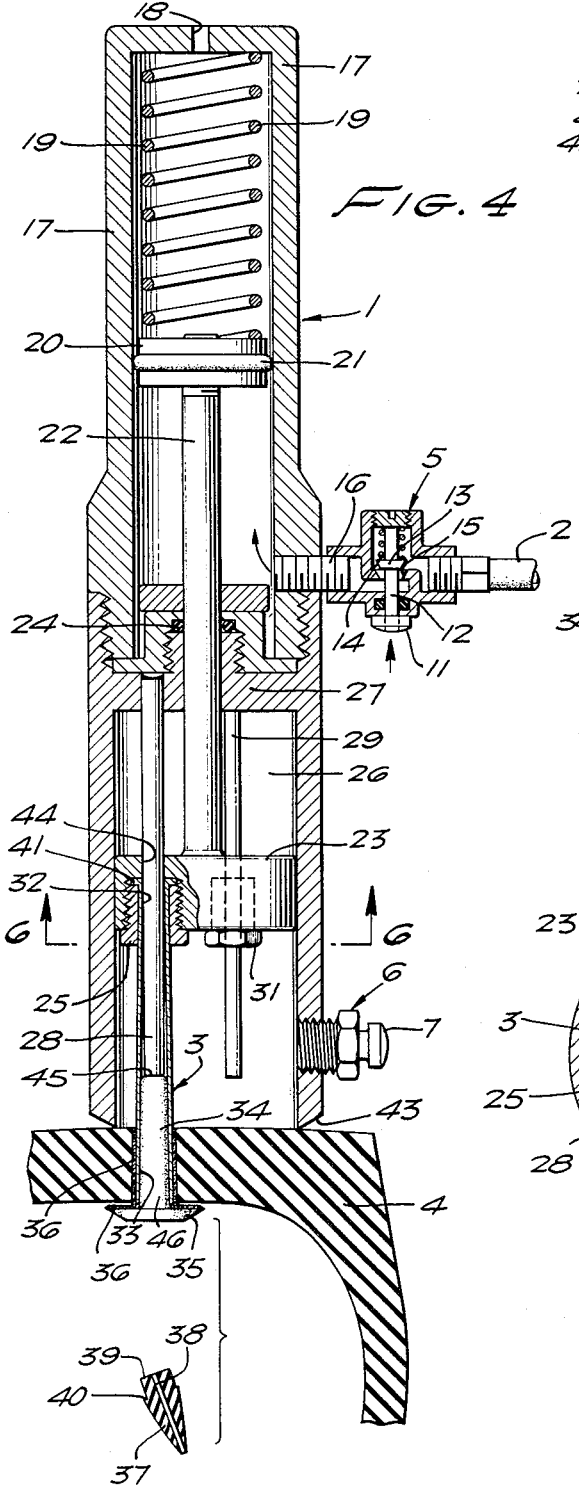
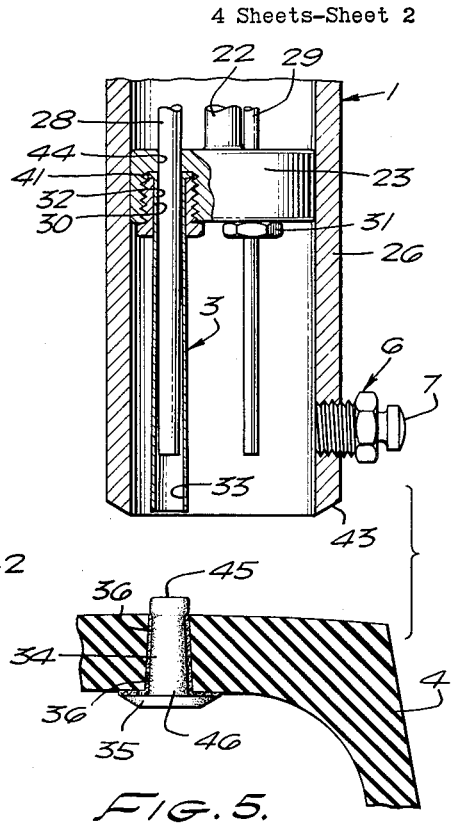
FIG. 4
FIG. 5.
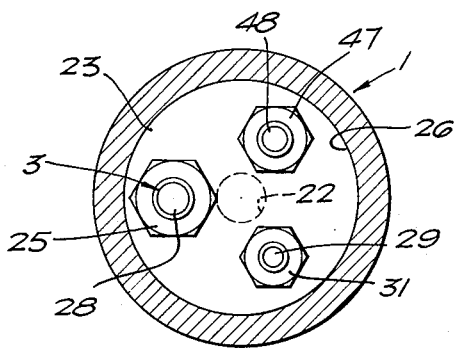
FIG. 6.
INVENTOR.
PAUL D. MITCHELL
BY
ATTORNEY

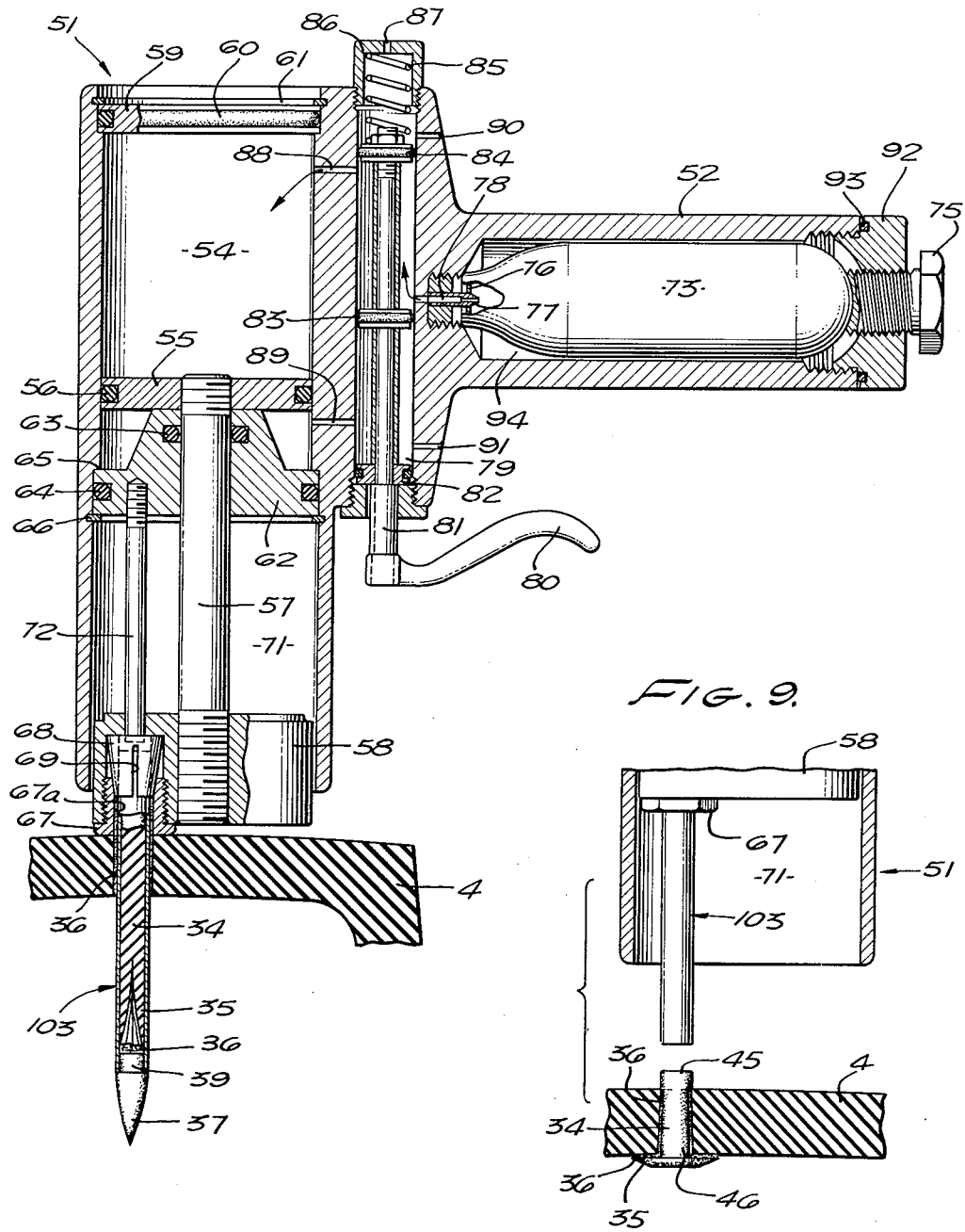

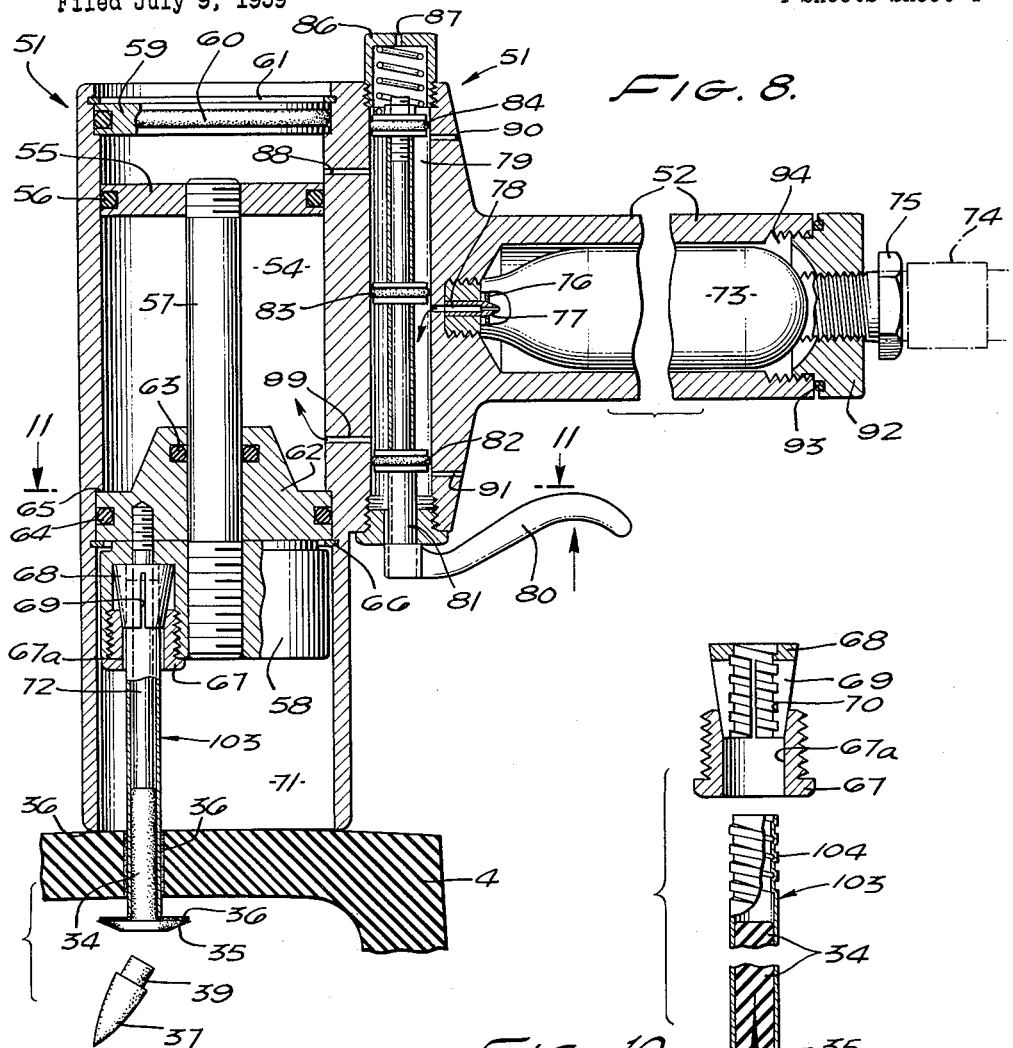
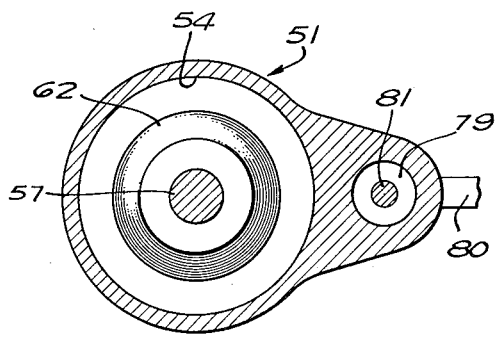

United States Patent Office 3,052,141
Patented Sept. 4, 1962

3,052,141
TIRE REPAIR GUN AND CARTRIDGE
Paul D. Mitchell, 24614 Kansas St., Newhall, Calif.
Filed July 9, 1959, Ser. No. 825,944
22 Claims. (Cl. 81—15.7)

This invention relates to repair plugs for tubeless tires and to a gun for inserting a cartridge containing one of said plugs into the tire and for withdrawing said cartridge from said tire.

The cartridge, according to the present invention, may be a cylindrical or tapered tube of relatively thin, stiff material, such as metal, having at one end thereof threads, a rim, flange or flared beveled edge. The interior surface of the cartridge may be substantially cylindrical or tapered, having a frusto-conical configuration with the smaller diameter thereof at the flanged end of the cartridge and the larger diameter at the other end. Within the cartridge is a compressed plug of rubber or other resilient material. When the cartridge is withdrawn from the plug, as by the gun of the present invention, the plug assumes its natural shape of a T, said T being formed by a frusto-conical leg having the larger diameter thereof integral with the T crossbar which is the sealing lip to be cemented to the inner surface of the tire.

The gun, according to the present invention, functions to insert the cartridge and plug into the hole through the tire from the exterior thereof while it is still on the wheel and functions to withdraw the cartridge member from the plug and tire by means of a fluid actuated piston, the plug being held in the tire by a pin within the gun.

In the repairing of punctures of tubeless tires, it is very desirable to be able to repair the puncture while the tire is on the wheel, first, in that it saves considerable time and effort in removing the tire from the wheel and putting it back onto the wheel and, second, in that in removing and in replacing the tire back upon the wheel, there is a tendency to damage the air sealing surface of the tire. In the past, other guns and cartridges carrying plugs therein have been devised to seal punctures in tires from the exterior thereof, but these have been generally unsuccessful in that the patching plugs so inserted, according to the prior art, tend to eventually leak.

An object of the present invention, therefore, is to provide an improved tire repair gun and an improved cartridge with plug therein to be used for sealing punctured tires.

It is a principal object of the present invention to provide an improved power-driven gun for inserting patch plugs into tire punctures, said gun being adaptable either in portable or non-portable form.

A further object of the present invention is to provide an improved tire repair gun and a cartridge containing a resilient plug to be inserted into the tire from the exterior thereof, said cartridge having a tapered plug therein under pressure, said plug being in the form of a T when the gun removes the cartridge from the plug. The leg of the T is of frusto-conical shape with the large diameter portion thereof extending from the crossbar of the T.

Another object of the present invention is to provide a patch plug which can be inserted in a tire, following the path provided by the puncture hole, without the prior use of a reaming probe.

Other objects of the invention are to provide means that are positive in operation, convenient in use, easily installed in a working position and easily disconnected therefrom, economical of manufacture, relatively simple and of general superiority and serviceability.

The invention also comprises novel details of construction and novel combinations and arrangements of parts, which will more fully appear in the course of the following description. However, the drawings merely show, and the following description merely describes, preferred embodiments of the present invention, which are given by way of illustration or example only.

In the drawings, like reference characters designate similar parts in the several views.

FIG. 4 is a cross-sectional view showing the cartridge partially withdrawn from the tire and plug;

FIG. 5 is a fragmentary, cross-sectional view of a cartridge that has been withdrawn from the tire showing the plug in sealing relationship with the tire;

FIG. 6 is a view taken along the line 6—6 of FIG. 4;

FIG. 7 is an elevational view of another embodiment of the gun and cartridge;

FIG. 8 is a view of the embodiment shown in FIG. 7 after the gun has been actuated;

FIG. 9 is a fragmentary view of the tire and gun after the cartridge has been completely withdrawn from the plug;

FIG. 10 is an enlarged elevational view of the cartridge shown in FIG. 7 and a fragmentary view of the means for securing the cartridge in the gun; and FIG. 11 is a view taken along the lines 11—11 of FIG. 8.

Figure 1:
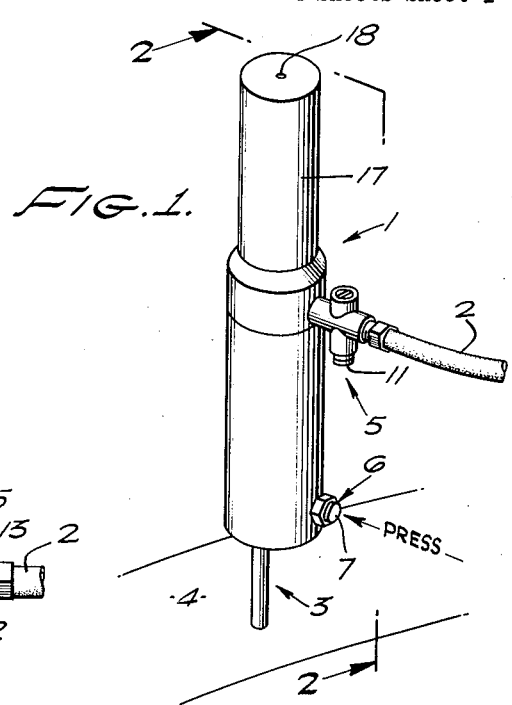
FIG. 1 is a perspective view of one embodiment of the invention in position for operation.

Referring to the drawings, FIG. 1 shows a perspective view of an elongated, substantially cylindrical gun casing attached to a fluid supply hose 2, the fluid being admitted to the gun through valve 5. As better indicated in FIG. 2, the gun has one end of cartridge 3 secured therein and the other end thereof has been partially inserted in a punctured hole made through the tread and carcass of tire 4.

The upper part of the gun consists generally of a cylinder 17 in which piston 20 is fitted for reciprocal movement. Piston 20 is held in its downward position, from which it may be fluid actuated, by means of spring 19 which abuts the upper surface of the piston and the upper inside surface of the cylindrical chamber 17. The top of chamber 17 has an air vent 18 which will permit the discharge of air as piston 20 is forced upwardly by the introduction of compressed air or other fluid below piston seal 21 in the cylindrical chamber 17.

Valve 5 is a typical air valve similar to those used on air hoses in filling stations and is comprised of a button 11 and extending inwardly therefrom is valve stem 12 which carries valve disc 13. Valve disc 13 is in the closed position on seat 15 where it is held by means of valve spring 14. Valve 5 is attached to cylinder 17 by means of the tube 16 which is directed to supply the incoming fluid below seal 21 on piston 20. Below cylindrical chamber 17 is a generally open-ended chamber 26 which is separated from the latter by wall 27. Extending downwardly from piston 20 and through an opening in wall 27 is piston rod 22. Chambers 17 and 26 are sealed from each other around rod 22 by means of an O-ring 24. Block or plunger 23 is secured on the lower end of rod 22 in chamber 26.

Figure 2:
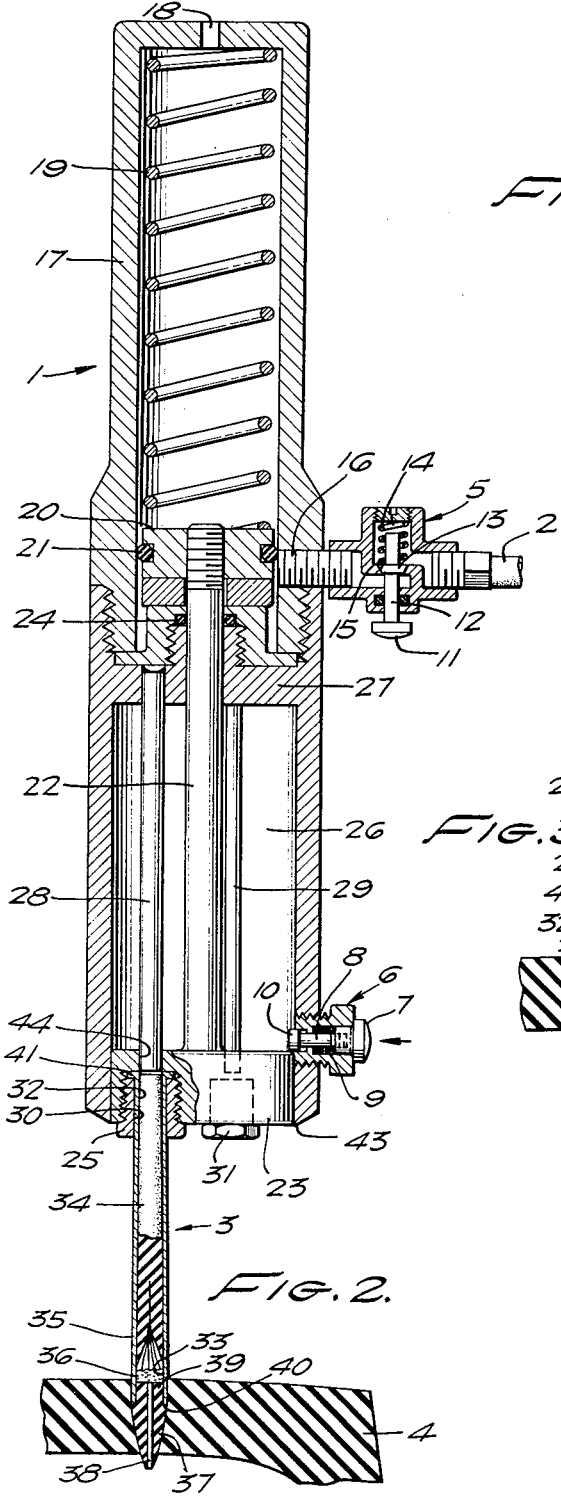
FIG. 2 is an elevational, cross-sectional view of one embodiment of the invention with the cartridge partially embedded in a tire, taken along the lines 2—2 of FIG. 1.

Pins 28, 29 and 48, the latter being shown only in FIG. 6, secured in wall 27, are downwardly directed so as to extend into openings in plunger 23 so as to permit it to move in a reciprocal motion on said pins. Each of the aforesaid openings, of which only opening 44 is shown in the drawings, the others not shown, is of a proper size with relation to the corresponding pin, as hole 44 is to pin 28, so that the plunger will move easily but relatively snugly thereon. Directly below opening 44 in plunger 23 is an enlarged diameter threaded opening for receiving insert 25 in threaded engagement. In plunger 23 there are as many threaded inserts and pins as practical, the pins being of different sized diameters in accordance with the size of the punctures in the tires to be repaired. Threaded plunger insert 31 is shown in FIG. 2 to receive the smaller of the three pins 29 whereas threaded insert 47 is shown in FIG. 6 to receive the intermediate sized pin 48.

Each of said inserts has an opening, such as hole 30, having a center on the axis of the said insert, and whose center is also on the axis of the corresponding pin, such as pin 28. The purpose of each insert is to hold a cartridge in place both when the cartridge is being inserted into the tire and when the cartridge is being withdrawn from the plug therein and the tire by operation of the gun.

For use with the gun 1, shown in FIGS. 1–6, three different sized cartridges 3 could be used to patch three different sized openings through a tire. Each cartridge, as one embodiment of the invention, may be formed from a tapered tube which has a small internal diameter 32 at one end thereof and a large internal diameter 33 adjacent the other end thereof; that is, the tube has a frusto-conical internal configuration and may have the same configuration externally or may be of an external cylindrical configuration depending upon the method by which it is manufactured. The cartridges 3 as shown in the drawings have substantially the same taper inside, as out.

At the small diameter end of cartridge 3, there is a rim or lip 41 which may be formed generally at right angles to the cartridge, as shown, or the tube may terminate in a lip formed from a flared or beveled end.

Figure 3:
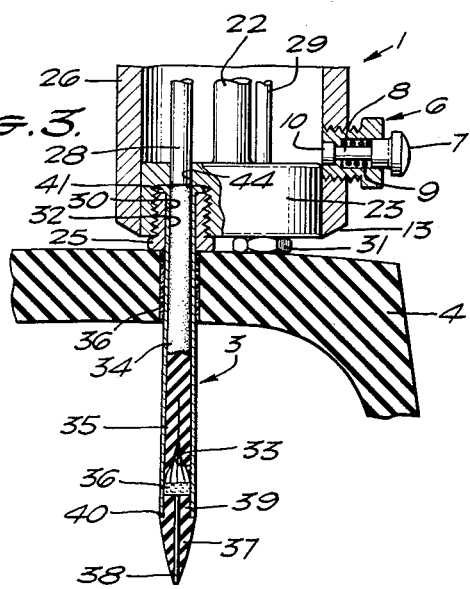
FIG. 3 is a cross-section fragmentary view of the embodiment in FIG. 2 showing the cartridge and plug fully inserted in the tire, the cartridge being in position to be withdrawn therefrom by the gun.

Substantially compressed within the cartridge is a plug patch of resilient material, such as butyl rubber, which in its compressed state follows the configuration of the tube. The rubber may be forced into the cartridge under pressure when lubricated by a lubricant, such as glycerin. When the cartridge is withdrawn from the plug, as indicated in FIG. 5, the plug has the configuration of a T, the leg of which is formed by a tapered body 34 of frusto-conical shape having a small diameter end 45, shown expanded, and an enlarged diameter portion 46 extending from the T crossbar or plug lip 35. In the cartridge, as shown in FIGS. 2 and 3, the lip 35 is folded and compressed outwardly away from the tapered body of the patch and is so arranged so as to open to form the T and be in abutment with the inside surface of the tire when it is placed in its sealing position.

At the large diameter end of the cartridge 3 is a hard rubber tip or pilot plug 37 having a longitudinal passage 38 which extends from the point of the tip into the cartridge and which has a small diameter portion 39 fitted in the cartridge and a shoulder 40 which limits the extent of entry of the tip 37 into the cartridge. Between the end of the plug patch and the pilot plug 37 may be some rubber cement 36. The latter may be inserted into the cartridge 3 when it is manufactured before the pilot plug 37 is so inserted or may be inserted therein by removal of the pilot plug just before the cartridge is inserted into the tire. In the former situation, the passage 38 would tend to seal and, thus, prevent the hardening of the cement whereas in the latter situation, the pilot plug 37 would be reinserted into the cartridge just before it is inserted into the tire and thereby hold the cement therein until the cartridge is withdrawn from the plug and the tire.

One of the advantages of the invention is that the cartridge and pilot plug may be inserted into the tire in the puncture hole without the prior use of a reaming tool; that is, the cartridge can be inserted and follow the passage provided by the puncture hole as made by a nail, for example.

In operation, the proper sized cartridge is selected according to the size of the hole in the tire and an insert, such as 25, is slipped over the large diameter end 33 so as to come into abutment with rim 41 when the said insert is secured tightly in plunger 23. At this point, the cartridge is ready for insertion into the tire and may be then dipped into rubber cement which provides a lubricant in going through the puncture hole and also provides the surface of the puncture hole with a sealing cement to aid in providing a proper seal with the plug patch.

In order to hold the plunger in its lower position adjacent the lower end 43 of the gun, a plunger lock 6 is provided, which, when button 7 is pushed inwardly by the operator, locking boss 10 on stem 8 will abut the inner upwardly directed surface of the plunger so as to prevent the upward movement of the plunger in the gun. The operator then may force the cartridge into the tire, after inserting the pilot plug, by pushing the gun and holding button 7 in the inward position. After the cartridge has been pushed into the tire so that insert 25 is in contact with the tread of tire 4, the release of button 7 by the operator will allow spring 9 to force the button outwardly and boss 10 into the body of plunger lock 6 away from the surface of the plunger. At this time, the gun is then ready for admission of gas or other fluid through valve 5 which normally would be connected to a filling station air hose 2, or if in a portable gun, could be connected to a small carbon dioxide cylinder.

The entry of air through valve 5 will force piston 20 upward, against spring 19, vent 18 allowing the air in chamber 17 to escape. The upward movement of piston 20 is simultaneous with the upward movement of rod 22 and plunger 23, as indicated in FIG. 4, where the plunger and piston have been moved about one-half way up their respective chambers. During the operation, as the insert 25, for example, is moved off of the tire, the operator will move the lower end of the gun 43 in abutment with the tire tread surface, as shown in FIG. 4.

As is indicated in FIG. 4, when the plunger moves upward onto pin 28, the plunger also carries cartridge 3 onto pin 28 and holds the plug in the tire, thus, withdrawing the cartridge from the tire and the plug. As the cartridge is withdrawn from the plug, pilot plug 37 is forced off and falls free on the inside of the tire. In FIG. 4, cartridge 3 has been moved sufficiently from the plug so as to permit lip 35 to open into T configuration. As lip 35 opens, it causes some of the rubber cement to spread on the inside of the tire as it runs down from within the cartridge 3 and from the surface on the exterior thereof as the cartridge is moved out of the tire. This assures the sealing cement will be located both on the inside surface of the tire immediately radially outwardly of the hole and on the outwardly directed surface of the lip which is made to contact the inside surface of the tire as cartridge 3 is completely withdrawn from the tire and plug, as indicated in FIG. 5. There the plug is in its substantially expanded size, tightly fitted into the puncture hole with the rubber cement 36 between the inner surface of the lip and inner surface of the tire and between the frusto-conical body 34 of the plug, which forms the leg of the T, and the surface of the tire forming the puncture hole.

The plug so inserted, forming a wedging configuration in abutment with the tire carcass and tread portion, will be aided in its cemented, sealed relationship by the air pressure in the tire; that is, lip 35 will be constantly forced against the inner surface of the tire and the frusto-conical shaped body 34 will be continuously wedged against the puncture opening in the tire. In FIG. 5, the small diameter end 45 of the plug is shown fully expanded in contrast to the remainder of the plug, somewhat contracted within the puncture hole. Tip 45 may be cut off or allowed to stay in place to be worn away.

It will be readily seen that even though the tapered body 34 of the plug will have great pressure exerted on it from the exterior of the tire in its normal rotation, any possible movement of the plug near the surface of the tire will not affect the cemented seal formed by the wedging action of the body 34 against the surface forming the puncture hole or the cemented seal formed by the lip 35 against the inner surface of the tire.

In FIGS. 7–11, additional embodiments of the gun and cartridge are illustrated. It should be noted that whereas different embodiments of the cartridges are shown to be specifically adapted to the different embodiments of the gun, each of the guns could be adapted to operate with either of the cartridges. In FIG. 7, gun 51 is shown with the cartridge extending into the tire and the gun is in position to remove the cartridge from the tire and plug in a manner similar to that described above and illustrated in FIG. 3 with gun 1.

Gun 51 has the appearance of an automatic pistol with a handle 52 for supporting a generally cylindrically shaped portion. The cylindrically shaped portion may be comprised of two main parts, the closed piston cylinder 54 and the open-ended plunger chamber 71, which are separated from each other by a stuffing box or sealing wall 62.

Piston 55 is adapted to be slidably engaged in cylinder 54 and a seal is formed between the surface of the cylinder and the piston by means of an O-ring 56. Piston rod 57 is secured at one end thereof to the piston and extends through the stuffing box 62 into the plunger chamber 71 where it is secured to a plunger or block 58. Plunger 58 is adapted to be slidably moved within chamber 71 when piston 55 is similarly moved in cylinder 54.

The outer end of cylinder 54 is closed by an end plate 59 which is held in sealing relationship with the cylinder by means of a snap ring 61, the seal being formed by the O-ring 60. Similar seals are formed in the stuffing box by the O-rings 63 and 64 in relation to the piston rod 57 and the exterior of the plunger chamber 71, respectively. The upper portion of the stuffing box wall abuts shoulder 65 and the stuffing box is held in place by a snap ring 66 which is engaged in the wall of the plunger chamber.

Plunger 59 operates in substantially the same manner as and is of a similar structure to plunger 23 in FIG. 3, except that it has a different type of insert and holding means for the cartridge 103. Plunger 58 is adapted to receive a plurality of inserts 67 (only one shown) in recesses in the external end thereof. Insert 67 may have a generally cylindrical passage 67a therethrough, said passage for convenience may be cut so that its upper end is tapered as best seen in FIG. 10. A collet 68 may be cut to be integral with plunger 58 or may be inserted in the plunger recesses along with insert 67. The open-ended collet 68 is tapered downwardly, having a frusto-conical configuration, with slits 69 cut therein and has internal threads 70 to engage threads 104 on the upper end of the cartridge. By having the upper end of the tire plug patch cartridge 103 terminating in a threaded end, it may be inserted into insert 67 and collet 68 and while both are untightened in the recess in plunger 58. Thus, there is no need to remove the insert from the plunger in order to insert the cartridge therein. After the threads 104 on the cartridge are engaged with the threads 70 in the collet, the nut on insert 67 may be tightened so as to compress the slitted collet tightly against the cartridge and thereby securely hold it.

A plurality of pins, such as pins 72, may be permanently engaged in the stuffing box 62, similarly to pin 28 in FIG. 1, except here the pin 72 is shown to be threadedly engaged.

$CO_2$ cartridge 73 may be inserted in the handle chamber 94 and held securely therein by handle end plate 92 which is threadedly engaged with the handle sealed therewith by O-ring 93. $CO_2$ cartridge 73 has a typical sealing end plate 76 which serves to open the cartridge when it is forced against the pin 77 which is secured in the upper inner part of the handle. Plate 76 is so forced against pin 77 by means of tightening bolt 75 in handle plate 92. One cartridge 73 is sufficient for several operations of the gun and thus provides an ideal means for supplying fluid pressure to the piston 55 so that the gun can operate in a portable manner. If the gun is to be used in a filling station, for example, where there is a continuous compressed air supply, cartridge 73 and bolt 75 can be removed from the handle and a typical compressed air supply hose 74, indicated in phantom outline in FIG. 8, can be threadedly engaged in handle plate 92 in the same manner as bolt 75.

In the upper part of the handle is cylindrical control chamber 79 which is connected to the compressed air or gas supply by means of port 78 which extends between cylinder 79 and chamber 94 in the handle. Slidably engaged in cylinder 79 is trigger rod 81 which is held in the direction of trigger 80 by means of spring 85, abutting the inner end surface of cap 86, as indicated in FIG. 7. Trigger 80 may be moved against the force of the spring when the operator grips the handle so as to move sealing discs 82, 83 and 84, all of which are mounted on rod 81, in a predetermined spaced relationship.

In the position shown in FIG. 7, with spring 85 holding the trigger away from the handle, air or other gas is permitted to pass through port 78 into the portion of chamber 79 between the sealing discs 83 and 84 and thence through port 88 into cylinder 54 where it will force piston 55 in the position indicated into abutment with the stuffing box 62. The fluid pressure used in this manner on piston 55 holds plunger 58 in a locked position so that the cartridge can be inserted into the puncture in the tire, as indicated above relation to gun 1.

After the cartridge has been inserted into the tire, shown in FIG. 7, the gun is then ready for operation to withdraw the cartridge 103 substantially off of the pressed tapered plug 34 and out of the tire. As may be seen in FIG. 8, the gun having been operated to accomplish the aforesaid withdrawal, the cartridge has not been completely removed from the tire or from the plug. Thus, when the trigger 80 is pulled to operate the gun, the trigger rod 81 and the discs thereon are moved in the direction of the spring 85 which is thereby compressed, as indicated in FIG. 8. When sealing disc 84 is moved by the trigger in the direction of the spring, the movement being toward cap 86 vented by passage 87, port 88 is then open to the atmosphere through a portion of cylinder 79 between discs 83 and 84 by means of vent 90. This permits the pressure in cylinder 54 on the upper side of the piston, in the drawing, to be dissipated into the atmosphere through vent 90.

The same movement of the trigger moves sealing discs 82 and 83 so that the fluid pressure entering cylinder 79 through port 78 is then permitted through port 89, to enter cylinder 54 on the lower side of the piston 55 so as to move it toward end plate 59. The movement of piston 55, as indicated in FIG. 8, pulls plunger 58 into abutment with stuffing box 62. This action of the gun forces pilot tip 37 and lip 35 out of the cartridge but leaves a substantial portion of the plug in the cartridge and some of the cartridge in the tire.

To further withdraw the cartridge 103 from the tire and from the tapered plug 34, the operator, holding the trigger in the position shown in FIG. 8, pulls the gun 51 slowly away from the tire and as this movement occurs, cartridge 103 draws the lip 35 of the patching plug 34 into sealing engagement with the inner surface of tire 4, and the operator then continues to withdraw the gun and cartridge away from the tire until the cartridge is completely out of the puncture hole, thereby leaving the tapered plug in the sealing arrangement shown in FIG. 9.

In this type of withdrawal of the cartridge from the tapered plug, the pin 72 holds the plug from moving in the direction out of the tire until the lower end of the gun is removed from the tire, and thereafter the relatively slow withdrawal of the remainder of the cartridge from the tire and tapered plug occurs without the aid of the pin. This type of withdrawal further assures that the lip will be in sealing engagement with the inner surface of the tire when the cartridge has been withdrawn from the plug; whereas when the gun 1 is used, the cartridge is completely withdrawn from the plug by the fast operation of the gun and the small end of the plug, as indicated in FIG. 5, may be pulled so as to make certain that lip 35 is in engagement with the inner surface of the tire.

After the gun has been completely withdrawn from the tire and the cartridge from the plug, then the trigger 80 may be released and spring 85 will force it back into position as shown in FIG. 7. In this position, the portion of cylinder 54 between the piston 55 and the stuffing box 62 is then vented to the atmosphere by port 89 in connection with that portion of cylinder 79 between discs 82 and 83 and vent 91. This, of course, will allow the piston 55 to be moved downward in abutment with the stuffing box 62 so that another cartridge can be inserted into one of the inserts in plunger 58.

The embodiment of the invention indicated as cartridge 103 has the same patch plug with tapered body 34 and lip 35, forming a T, as indicated in FIG. 9, as the cartridge 3. Cartridge 103 also may be used with the same rubber pilot tip 37, having the rubber cement 36 within the cartridge between the small diameter portion 39 and the end of the compressed plug lip. Cartridge 103 also, when used, may be dipped into rubber cement so as to provide a rubber cement coating in the puncture hole externally of the plug 34. In contrast to cartridge 3, cartridge 103 may be substantially cylindrical on its interior surface as well as its exterior surface and is illustrated with substantially square threads 104 for engagement in the collet 68. This type of thread arrangement makes possible the insertion of the cartridge into the insert without withdrawing the insert from the plunger of the gun.

As aforesaid, the different types of cartridges may be interchanged with the different type guns depending upon the type of inserts in the plungers 23 and 58 of the guns. In either event, the resulting patch plug seals the puncture hole as illustrated in FIGS. 5 and 9.

My description in specific detail of the presently preferred practices of the invention for the purpose of disclosure to illustrate the principles involved will suggest to those skilled in the art various changes, modifications, and other departures from my disclosure that properly lie within the spirit and scope of the appended claims.

What is claimed is:

1. In a tire repair plug gun for the insertion of a cartridge loaded with a plug into the hole of the tire and for the withdrawal of said cartridge from said plug and said tire so as to leave said plug in sealing relationship with said tire, said cartridge having an external rim at one end thereof, the improvement comprising: a vented cylinder at one end of said gun; a piston slidably engaged within said cylinder; fluid supply means to permit fluid to enter said cylinder to force said piston toward said one end; a piston rod connected to said piston and extending away from said one end of said gun toward the other end of said gun; a member secured to said other end of said rod; said member having means therein for holding said cartridge therein by engagement with said rim at one end thereof; and means extending through said one member in alignment with said cartridge for holding said plug in position when said piston and said one member are moved toward said one end of said gun.

2. In a tire repair plug gun for the insertion of a cartridge loaded with a plug into the hole of the tire and for the withdrawal of said cartridge from said plug and said tire so as to leave said plug in sealing relationship with said tire, said cartridge having means for securing in said gun at one end thereof, the improvement comprising: a vented cylinder at one end of said gun; a piston slidably engaged within said cylinder; fluid supply means to permit fluid to enter said cylinder to force said piston toward said one end; a piston rod connected to said piston and extending away from said one end of said gun toward the other end of said gun; a member secured to said other end of said rod; said member having means therein for holding said cartridge therein by engagement with said securing means at one end thereof; and means extending through said one member in alignment with said cartridge for holding said plug in position when said piston and said one member are moved toward said one end of said gun.

3. In a tire repair plug gun for the insertion of a cartridge with plug therein into a hole of the tire and for the withdrawal of said cartridge from said tire whereby said plug is left in sealing engagement in said hole, said cartridge having an external rim at one end thereof, the improvement comprising: a vented cylinder at one end of said gun; a piston engaged for reciprocal travel within said cylinder; means to supply fluid to said cylinder to force said piston toward said one end; a plunger chamber at the other end of said gun; a plunger fitted for reciprocal travel in said chamber; a piston rod connecting said piston with said plunger for moving said plunger with said piston; means for securing said one end of said cartridge within said plunger and having the other end of said cartridge extending outwardly away from said plunger and said gun; means for holding said plunger adjacent said other end of said gun; and pin means in said plunger chamber and secured at one end thereof in said gun between said plunger chamber and said piston cylinder; said pin means being in alignment with said plug in said cartridge within said plunger; said pin means extending into said plunger so that the other end thereof is adjacent said plug in said cartridge when said cartridge is secured in said plunger and said cartridge is adjacent said other end of said gun.

4. The invention according to claim 3 in which said cartridge rim is held in said plunger by means of an inert which is threadably engaged in said plunger and through which said cartridge extends outwardly of said plunger.

5. The invention according to claim 4 in which said means to hold said plunger adjacent said other end of said gun comprises spring-biased boss means extending inwardly through said plunger chamber so as to contact an inward portion of said plunger.

6. In a tire repair plug gun for the insertion of a cartridge with plug therein into a hole of the tire and for the withdrawal of said cartridge from said tire whereby said plug is left in sealing engagement in said hole, said cartridge having threads at one end thereof, the improvement comprising: a vented cylinder at one end of said gun; a piston engaged for reciprocal travel within said cylinder; means to supply fluid to said cylinder to force said piston toward said one end; a plunger chamber at the other end of said gun; a plunger fitted for reciprocal travel in said chamber; a piston rod connecting said piston with said plunger for moving said plunger with said piston; means for securing said one end of said cartridge within said plunger and having the other end of said cartridge extending outwardly away from said plunger and said gun; means for holding said plunger adjacent said other end of said gun; and pin means in said plunger chamber and secured at one end thereof in said gun between said plunger chamber and said piston cylinder; said pin means being in alignment with said plug in said cartridge within said plunger; said pin means extending into said plunger so that the other end thereof is adjacent said plug in said cartridge when said cartridge is secured in said plunger and said cartridge is adjacent said other end of said gun.

7. The invention according to claim 6 in which said one end of said cartridge is held in threaded engagement in a collet in said plunger; said collet being compressible by an insert in said plunger which is threadedly engaged in said plunger and through which said cartridge extends outwardly of said plunger.

8. In a tire repair plug gun for the insertion of a cartridge having a plug therein into a hole of the tire and for the withdrawal of said cartridge from said tire so as to leave said plug within said hole in sealing engagement with said tire, the improvement comprising: a vented cylindrical piston chamber at one end of said gun and an elongated plunger chamber at the other end of said gun; a piston adapted for reciprocal movement within said cylinder; means to supply fluid into said piston cylinder to move said piston toward said one end of said gun; a piston rod connected at one end thereof to said piston and extending therefrom into said plunger chamber; a plunger secured to the other end of said rod; a plurality of different sized passages extending through said plunger, said passages having axes generally parallel to the axis of said piston rod; a cartridge having an external rim at one end thereof releasably secured in one of said different sized passages through said plunger corresponding to the size of said cartridge; said cartridge being secured by an insert adapted to be threadedly engaged to hold said cartridge in a portion of a corresponding passage in said plunger; a wall separating said piston cylinder from said plunger chamber, said piston rod being fitted for reciprocal movement through said wall; a plurality of elongated pins of different diameters having one end thereof secured in said wall and extending so that the other end thereof extends into a corresponding sized passage in said plunger; said plunger being fitted for reciprocal motion on said pins within said plunger chamber; each of said pins being of a size corresponding to the diameter at said rim end of a corresponding cartridge so that a corresponding pin is slidable in a corresponding cartridge and insert; and releasable spring-biased means for holding said plunger adjacent said other end of said gun when said gun is used to insert a cartridge into said hole in said tire.

9. The invention according to claim 8 in which a cartridge having said rimmed end secured in said plunger is tapered so that the small internal diameter thereof is at said rimmed end and the large internal diameter thereof is at said other end of said cartridge.

10. The invention according to claim 9 in which said plug in said cartridge is of a tapered configuration similar to the taper of said cartridge, said plug being of resilient material and being compressed and elongated in said cartridge; said plug having a peripheral lip adjacent said other end of said cartridge and compressed against the inside of said cartridge so as to extend away from said rimmed end of said cartridge; said lip being adapted to extend radially outward from said end of said plug when said cartridge is withdrawn therefrom so as to form a T-shaped plug, the other end of said cartridge having a removable pointed end; said pointed end having a passage extending from the exterior thereof into said cartridge; and cementing fluid in said cartridge between said pointed end and said plug.

11. In a tire repair plug gun for the insertion of a cartridge having a plug therein into a hole of the tire and for the withdrawal of said cartridge from said tire so as to leave said plug within said hole in sealing engagement with said tire, the improvement comprising: a vented cylindrical piston chamber at one end of said gun and an elongated plunger chamber at the other end of said gun; a piston adapted for reciprocal movement within said cylinder; means to supply fluid into said piston cylinder to move said piston toward said one end of said gun; a piston rod connected at one end thereof to said piston and extending therefrom into said plunger chamber; a plunger secured to the other end of said rod; a plurality of different sized passages extending through said plunger, said passages having axes generally parallel to the axis of said piston rod; a cartridge having threads at one end thereof releasably secured in one of said different sized passages through said plunger corresponding to the size of said cartridge; said cartridge being secured by an insert adapted to be threadedly engaged to hold said cartridge in a portion of a corresponding passage in said plunger; a wall separating said piston cylinder from said plunger chamber, said piston rod being fitted for reciprocal movement through said wall; a plurality of elongated pins of different diameters having one end thereof secured in said wall and extending so that the other end thereof extends into a corresponding sized passage in said plunger; said plunger being fitted for reciprocal motion on said pins within said plunger chamber; each of said pins being of a size corresponding to the diameter at said threaded end of a corresponding cartridge so that a corresponding pin is slidable in a corresponding cartridge and insert; and means to supply fluid into said piston cylinder and move said piston toward said other end of said gun for holding said plunger adjacent the other end of said gun when said gun is used to insert a cartridge into said hole in said tire.

12. The invention according to claim 11 in which said plug in a cartridge is of a tapered configuration having its small diameter end adjacent said threaded end of said cartridge; said plug being of resilient material and being compressed and elongated in said cartridge; said plug having a peripheral lip adjacent said other end of said cartridge and compressed against the inside of said cartridge so as to extend away from said threaded end of said cartridge; said lip being adapted to extend radially outward from said end of said plug when said cartridge is withdrawn therefrom so as to form a T-shaped plug, the other end of said cartridge having a removable pointed end; said pointed end having a passage extending from the exterior thereof into said cartridge; and cementing fluid in said cartridge between said pointed end and said plug.

13. In a tire repair gun for the insertion of a cartridge loaded with a plug into the hole of the tire and for the withdrawal of said cartridge from said plug and said tire so as to leave said plug in sealing relationship with said tire, said cartridge having means at one end thereof for securing in said gun, the improvement comprising: a vented cylinder at one end of said gun; a piston slidably engaged within said cylinder; means to alternately supply fluid to said cylinder to force said piston toward said one end of said gun and to hold said piston toward said other end of said gun; a piston rod connected to said piston and extending away from said one end of said gun toward the other end of said gun; a member secured to said other end of said rod; said member having means therein for engaging said cartridge securing means; and means extending through said one member in alignment with said cartridge when secured therein for holding said plug against movement when said piston, said one member and said cartridge are moved toward said one end of said gun.

14. In a tire repair plug gun for insertion of a cartridge with plug therein into a hole of the tire and for withdrawal of said cartridge from said tire whereby said plug is left in sealing engagement in said hole, the improvement comprising: a vented piston cylinder at one end of said gun; a piston engaged for reciprocal travel within said piston cylinder; a plunger chamber at the other end of said gun; a plunger for reciprocal travel in said chamber; a piston rod connecting said piston with said plunger for moving said plunger with said piston; a control cylinder on said gun; a rod adapted for reciprocation within said control cylinder; trigger means externally of said control cylinder to move said rod in one direction and spring means adjacent control cylinder to move said rod in the other direction; sealing discs spaced on said rod in sealing contact with the inner wall of said control cylinder; flow passages in said gun connecting said piston cylinder to said control cylinder on each side of said piston; said spring holding said rod and said discs so as to permit said piston cylinder to be vented on the side of said piston toward the other end of said gun and to connect a main fluid supply to said piston cylinder on the side of said piston adjacent said one end of said gun to force said piston toward the other end of said gun; said trigger means being connected to move said rod and said discs against said spring so as to permit said piston cylinder to be vented on said side of said piston toward said one end of said gun and to connect said main fluid supply to said piston cylinder on the other side of said piston toward said other end of said gun to force said piston toward said one end of said gun; means in said plunger for securing one end of said cartridge therein and having the other end of said cartridge extending outwardly away from said plunger and said gun; and pin means in said plunger chamber and secured at one end thereof in said gun between said plunger chamber and said piston cylinder; said pin means being positioned for alignment with said plug in said cartridge within said plunger; said pin means extending into said plunger so that the other end thereof is adjacent said plug in said cartridge when said cartridge is secured in said plunger and said cartridge is adjacent said other end of said gun.

15. In a tire repair plug gun for the insertion of a cartridge having a plug therein into a hole of the tire and for the withdrawal of said cartridge from said tire so as to leave said plug within said hole in sealing engagement with said tire, the improvement comprising: a vented piston cylinder at one end of said gun and an open-ended plunger chamber at the other end of said gun; a piston adapted for reciprocal movement within said piston cylinder; a piston rod conencted at one end thereof to said piston and extending therefrom into said plunger chamber; a plunger secured at the other end of said rod; a control cylinder in said gun adjacent said piston cylinder; a main operating fluid supply means connection to said control cylinder; a first port from said control cylinder to said piston cylinder adjacent one end of said gun and one side of said piston; a second port from said control cylinder to said piston cylinder on the other side of said piston; a rod having spaced sealing discs thereon in said control cylinder; said rod and said discs being adapted for reciprocal movement in said control cylinder and being held in one direction away from said one end of said gun by a spring adjacent said control cylinder; a trigger on said rod externally of said control cylinder for moving said rod and discs in the other direction against said spring; said discs on said rod adapted to close a first portion of said control cylinder when said spring is holding said disc in said one direction to provide a first sealed passage from said main supply means through said first portion of said control cylinder and through said first port on said one side of said piston into said piston cylinder to hold said piston and said plunger toward the other end of said gun; said trigger being adapted to move said rod and said sealing discs so as to close a second portion of said control cylinder to provide a second sealed passage through said second portion of said control cylinder so as to connect said main supply means to said second port and said piston cylinder to move said piston toward said one end of said gun; a plurality of different size passages extending through said plunger; said passages having axes generally parallel to the axis of said piston rod; a cartridge having threads on one end thereof releasably secured in one of said different size passages through said plunger corresponding to the size of said cartridge; said cartridge being secured by an insert adapted to be threadedly engaged to hold said cartridge in a portion of a corresponding passage in said plunger; a wall separating said piston cylinder from said plunger chamber; said piston rod being fitted for reciprocal movement through said wall; a plurality of elongated pins of different diameters having one end thereof secured in said wall and extending so that the other end thereof extends into a corresponding sized passage in said plunger; said plunger being fitted for reciprocal motion on said pins within said plunger chamber; each of said pins being of a size corresponding to the internal diameter of said threaded end of a corresponding cartridge so that a corresponding pin is slidable in a corresponding cartridge and insert.

16. The invention according to claim 15 in which said gun has a handle; said handle having a sealed chamber for receiving a compressed gas cartridge; said compressed gas cartridge having a breakable seal at one end thereof; a pin within said gun aligned with and for breaking said seal when said cartridge is forced against said pin; and means on said handle for forcing said cartridge seal into contact with said pin; said pin having a duct therethrough forming said main fluid supply passage between said handle chamber and said control cylinder.

17. The invention according to claim 14 in which said means in said plunger for securing said cartridge comprise a collet in a recess in said plunger and insert in said recess to tighten said collet on one end of said cartridge.

18. A tire repair device comprising: an elongated hollow body of rigid material; an element of resilient material in compression in said body in a position spaced from one end thereof; a plug mounted in a position closing said one end of said body; and cement in said body between said element and said plug.

19. A tire repair device comprising: an elongated hollow body of rigid material; an element of resilient material in compression in said body in a position spaced from one end thereof; a plug mounted in a position closing said one end of said body; and cement in said body between said element and said plug, said plug having a longitudinal passageway therethrough to permit said cement to be driven therethrough outwardly on the tire.

20. In a repair plug for tubeless tires including an elongated tube of rigid material of sufficient length to extend through the tread and carcass of a tubeless tire, the improvement comprising: said tube having an internal tapered surface so that the internal small diameter portion thereof is at one end and the internal large diameter portion thereof is at the other end of said tube; a frusto-conical element of resilient material within said tube; said element being compressed in diameter and elongated within said tube so as to have an exterior configuration corresponding to the configuration of the interior of said tube; said element being in said compressed state in said tapered tube whereby after removal of the tube, the element expands into a shortened frusto-conical plug for engaging the wall of an opening through the tread and carcass of a tubeless tire; said element having a lip member extending from the large diameter end thereof adjacent said large diameter end of said tube; said lip member being folded away from said element and compressed against the internal surface of said tube; said lip member forming a T with said frusto-conical plug when said tube is removed from said element; said plug being the leg of said T and said lip being the crossbar of said T; said other end of said tube having an insert fitted therein, said insert having a pointed end extending therefrom; said insert having a passage communicating with the exterior thereof and the interior of said tube; and a sealing compound within said tube between said element and said insert.

21. A tire repair gun comprising: a cylinder; a piston in said cylinder; tube-like means; a rubber-like plug compressed in said tube-like means, said plug having a frusto-conical head fixed to and folded away from a shank in said tube-like means; pin means to fit inside said tube-like means; a pneumatic device actuatable to introduce air under pressure into said cylinder to move said piston from a first to a second position, one of said means being fixed relative to said cylinder, said piston being connected with said means to cause movement of the other of said means relative to said cylinder in a manner to expel the head of said plug from one end of said tube-like means; and a stop fixed with said cylinder to prevent said movement of said piston therein beyond said second position and to limit movement of said other means to a distance such that said plug shank is retained in said tube-like means when said piston moves to said second position.

22. A tire repair gun comprising: tube-like means; an elastomeric plug compressed in said tube-like means, said plug having a frusto-conical head fixed to a shank in said tube-like means; pin means to fit inside said tube-like means; a body to carry said means, one of said means being fixed relative to said body; a source of motive power to move the other of said means relative to said body from a first to a second position to expel the head of said plug from one end of said tube-like means; and a stop fixed with said body to limit movement of said other means from said first to said second position to a distance such that said plug shank is retained in said tube-like means when said other means engages said stop at said second position.

References Cited in the file of this patent

UNITED STATES PATENTS

| | | |
|---|---|---|
| 1,332,412 | Ranney | Mar. 2, 1920 |
| 1,833,194 | Young | Nov. 24, 1931 |
| 1,897,028 | Anderson | Feb. 14, 1933 |
| 2,828,657 | Fromberg | Apr. 1, 1958 |
| 2,828,791 | Fromberg | Apr. 1, 1958 |
| 2,966,190 | Nowotny | Dec. 27, 1960 |